(12) United States Patent
Homes (10) Patent No.: US 8,893,593 B2
(45) Date of Patent: Nov. 25, 2014

(54) TOOL FOR DEFORMING THREADS AT A PARTICULAR LOCATION ON A FASTENER

(75) Inventor: David W. Homes, Tucson, AZ (US)

(73) Assignee: Raytheon Company, Waltham, MA (US)

(*) Notice: Subject to any disclaimer, the term of this patent is extended or adjusted under 35 U.S.C. 154(b) by 695 days.

(21) Appl. No.: 12/895,937

(22) Filed: Oct. 1, 2010

(65) Prior Publication Data

US 2012/0079867 A1  Apr. 5, 2012

(51) Int. Cl.
*B25B 7/00* (2006.01)
*B21K 1/56* (2006.01)
*F16B 39/30* (2006.01)

(52) U.S. Cl.
CPC .. *B21K 1/56* (2013.01); *F16B 39/30* (2013.01)
USPC ............................................ 81/300; 408/227

(58) Field of Classification Search
USPC ........... 7/106; 408/227, 117, 123; 81/30, 300, 81/421, 426; 15/104.001; 30/363; 72/325, 72/402.13, 402.17, 402.18; 470/209
See application file for complete search history.

(56) References Cited

U.S. PATENT DOCUMENTS

| | | | |
|---|---|---|---|
| 74,601 A * | 2/1868 | Rothschild | 72/409.18 |
| 413,317 A * | 10/1889 | Deweese | 408/154 |
| 645,927 A * | 3/1900 | Harmon | 30/363 |
| 1,176,793 A * | 3/1916 | Tuttle | 29/21.1 |
| 1,679,039 A * | 7/1928 | Kucera | 30/363 |
| 2,177,004 A | 10/1939 | Purtell | |
| 2,414,870 A | 1/1947 | Harding | |
| 2,855,817 A | 10/1958 | Kopf | |
| 3,132,343 A * | 5/1964 | Kahn | 227/144 |
| 3,474,845 A | 10/1969 | Podell | |
| 3,597,775 A * | 8/1971 | McCasland | 7/106 |
| 3,680,351 A * | 8/1972 | Koshinen | 72/409.13 |
| 4,009,651 A * | 3/1977 | Adams | 99/579 |
| 4,554,736 A * | 11/1985 | Rodriguez | 30/120.3 |

(Continued)

FOREIGN PATENT DOCUMENTS

DE  29917482 U1  2/2001
WO  WO-2012/044343 A1  4/2012

OTHER PUBLICATIONS

"International Application Serial No. PCT/US2011/001352, Search Report mailed Dec. 28, 2011", 2 pgs.

(Continued)

*Primary Examiner* — Hadi Shakeri
*Assistant Examiner* — Danny Hong
(74) *Attorney, Agent, or Firm* — Schwegman Lundberg & Woessner, P.A.

(57) ABSTRACT

Some embodiments pertain to a tool that includes a first arm and a second arm that is rotatably connected to the first arm. The first arm includes an opening and the second arm includes a projection that engages threads on a fastener which is installed within the opening in the first arm. During operation of the tool, a fastener is inserted into the opening in the first arm. Pressure is applied to bring the first and second arms together such that the projection engages the threads of the fastener and then deforms the threads. The first arm may include a plurality of threaded openings such that each opening is adapted to receive a different diameter fastener. In addition, the second arm may include a plurality of projections such that each projection is a different size and is aligned relative to one of the openings in the first arm.

3 Claims, 7 Drawing Sheets

(56) References Cited

U.S. PATENT DOCUMENTS

| | | | | |
|---|---|---|---|---|
| 4,881,434 | A | * | 11/1989 | Keller .............................. 81/426 |
| 5,022,253 | A | * | 6/1991 | Parlatore ........................ 72/325 |
| 5,060,330 | A | * | 10/1991 | Stahl ............................ 470/209 |
| 5,373,866 | A | * | 12/1994 | Whalen, II ..................... 137/318 |
| 5,490,746 | A | * | 2/1996 | Baker ........................... 408/123 |
| 5,513,513 | A | * | 5/1996 | Suess et al. ................. 72/409.18 |
| 5,634,272 | A | * | 6/1997 | Samuelson ................... 30/120.3 |
| 6,863,483 | B2 | | 3/2005 | Koenig et al. |
| 7,418,756 | B1 | * | 9/2008 | Ortega ...................... 15/104.001 |
| 2008/0313317 | A1 | | 12/2008 | Berger et al. |

OTHER PUBLICATIONS

"International Application Serial No. PCT/US2011/001352, Written Opinion mailed Dec. 28, 2011", 4 pgs.

"International Application Serial No. PCT/US2011/001352, International Preliminary Report on Patentability mailed Apr. 11, 2013", 6 pgs.

"Australian Application Serial No. 2011307580, Examination Report No. 1 mailed Jun. 16, 2014", 3 pgs.

* cited by examiner

TOOL FOR DEFORMING THREADS AT A PARTICULAR LOCATION ON A FASTENER

GOVERNMENT SUPPORT CLAUSE

This invention was made with government support under Contract Number FA8675-07-C-0055 awarded by the United States Air Force. The government has certain rights in the invention.

TECHNICAL FIELD

Embodiments pertain to a tool, and more particularly to a tool that deforms threads at a particular location on a fastener.

BACKGROUND

One of the most common ways to assemble a plurality of parts together is by securing the parts together with a fastener. Many designs are densely packaged and usually include a number of parts that are manufactured according to various tolerances. This tolerance build-up in an assembly makes it hard to select an appropriate standard-size fastener because a standard-size fastener may not fully engage the appropriate components with locking features under all tolerance scenarios.

The fastened joints in many assemblies are typically subject to vibration (or other types of potentially problematic loading). Depending on the degree of the vibrations (or loading), the vibrations may cause a problem even if a sufficient amount of torque is used to secure the assembly together.

One of the ways that tolerance build-up is currently addressed is by using lock-washers and/or locking inserts. However, lock-washers and locking inserts usually add (i) expense; (ii) weight; and/or (iii) an increase in the total number of parts to an assembly.

Another way that tolerance build-up is currently addressed is by using an adhesive. Adhesives also usually add expense and weight to an assembly. In addition, adhesives often complicate the manufacturing processes that are associated with fabricating an assembly that includes adhesives.

There is a need for a tool that readily modifies standardized fasteners to make them suitable for securing components of varying tolerances together to form an assembly. The tool should reduce (or eliminate) the need for adhesives, lock washers and/or locking inserts in fabricating an assembly where the fasteners are used.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIGS. 1-10 illustrate an example tool 10 that includes a first arm 12 and a second arm 14 that is rotatably connected the first arm 12. The first arm 12 includes an opening 16 and the second arm 14 includes a projection 17. The opening 16 and projection 17 are positioned on the respective first and second arms 12, 14 such that the projection 17 engages threads 21 on a fastener 20 which is installed within the opening 16 in the first arm 12 (shown most clearly in FIGS. 6-8).

Figure 1:
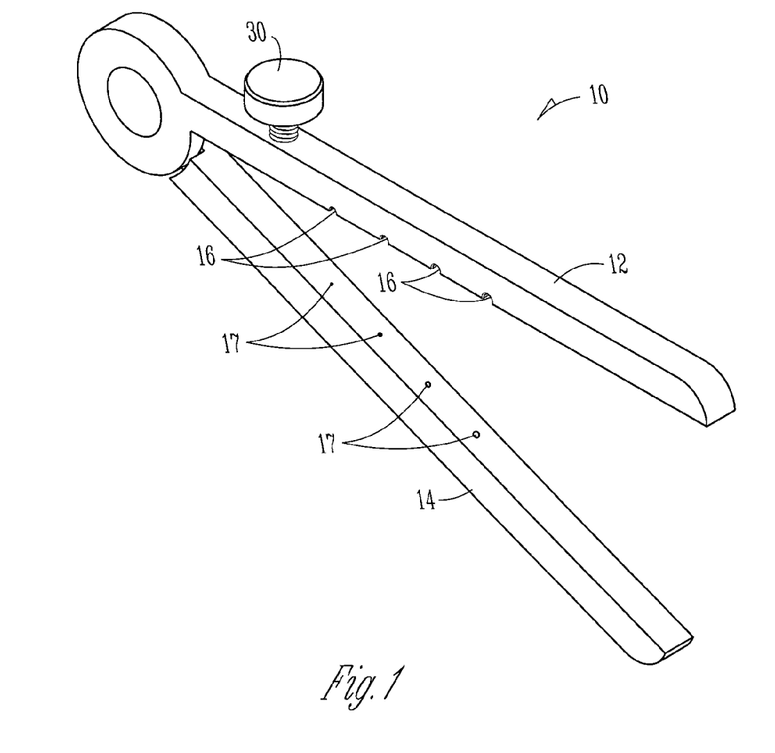
FIG. 1 is a perspective view of an example hand tool.
Figure 2:
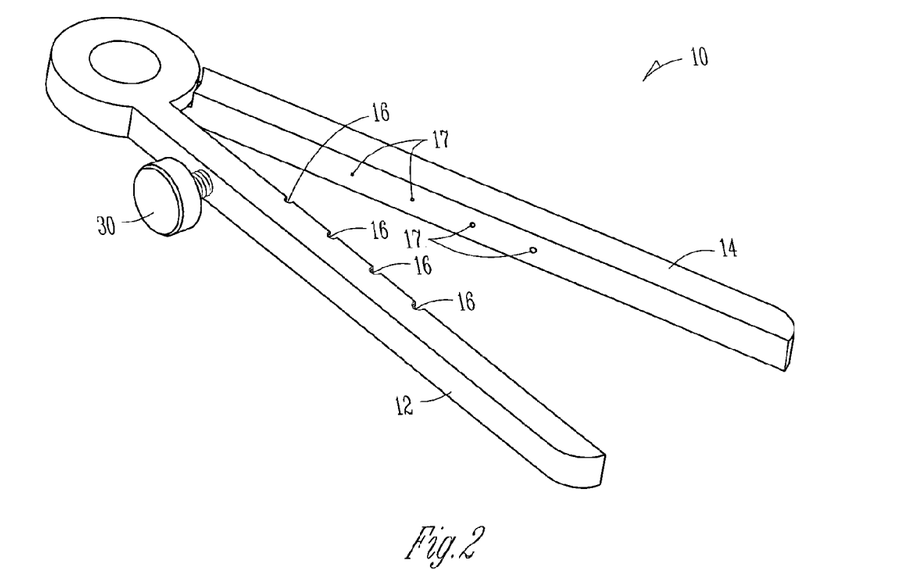
FIG. 2 is another perspective view of the hand tool shown in FIG. 1.
Figure 3:
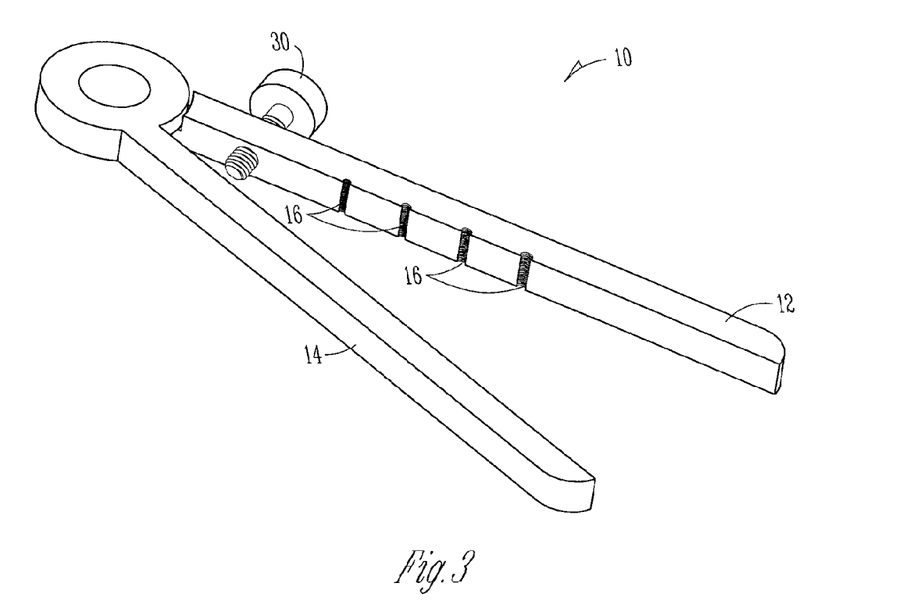
FIG. 3 is yet another perspective view of the hand tool shown in FIG. 1.
Figure 4:
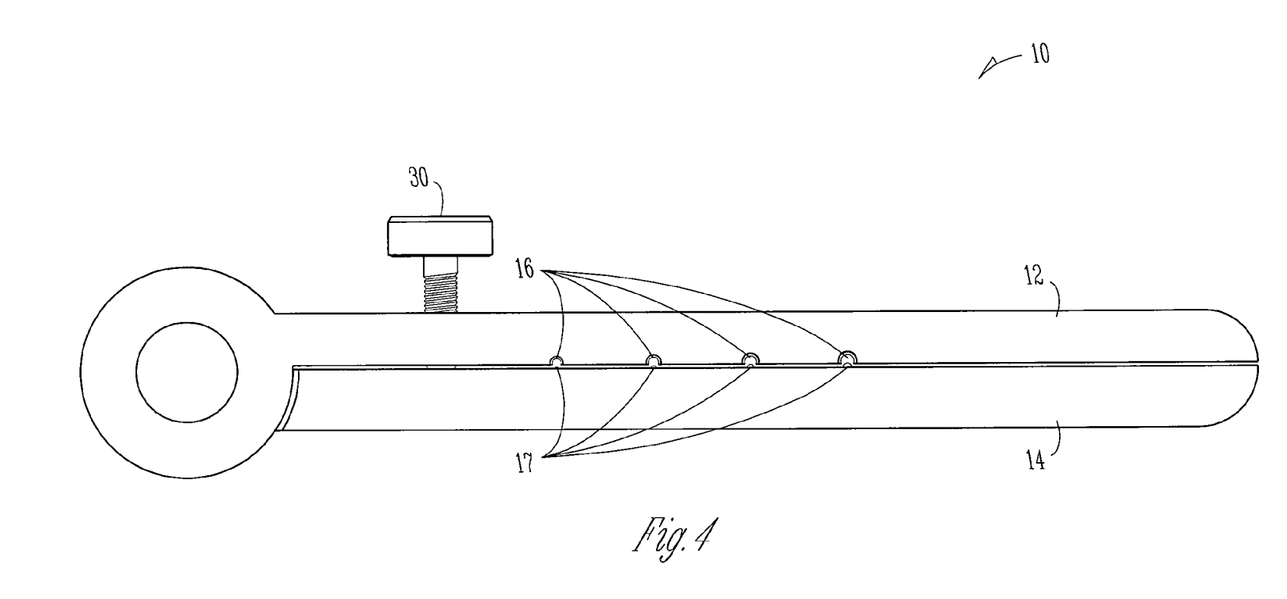
FIG. 4 is a side view of the hand tool shown in FIG. 1 with the arms of the hand tool closed and no fastener within the tool.
Figure 5:
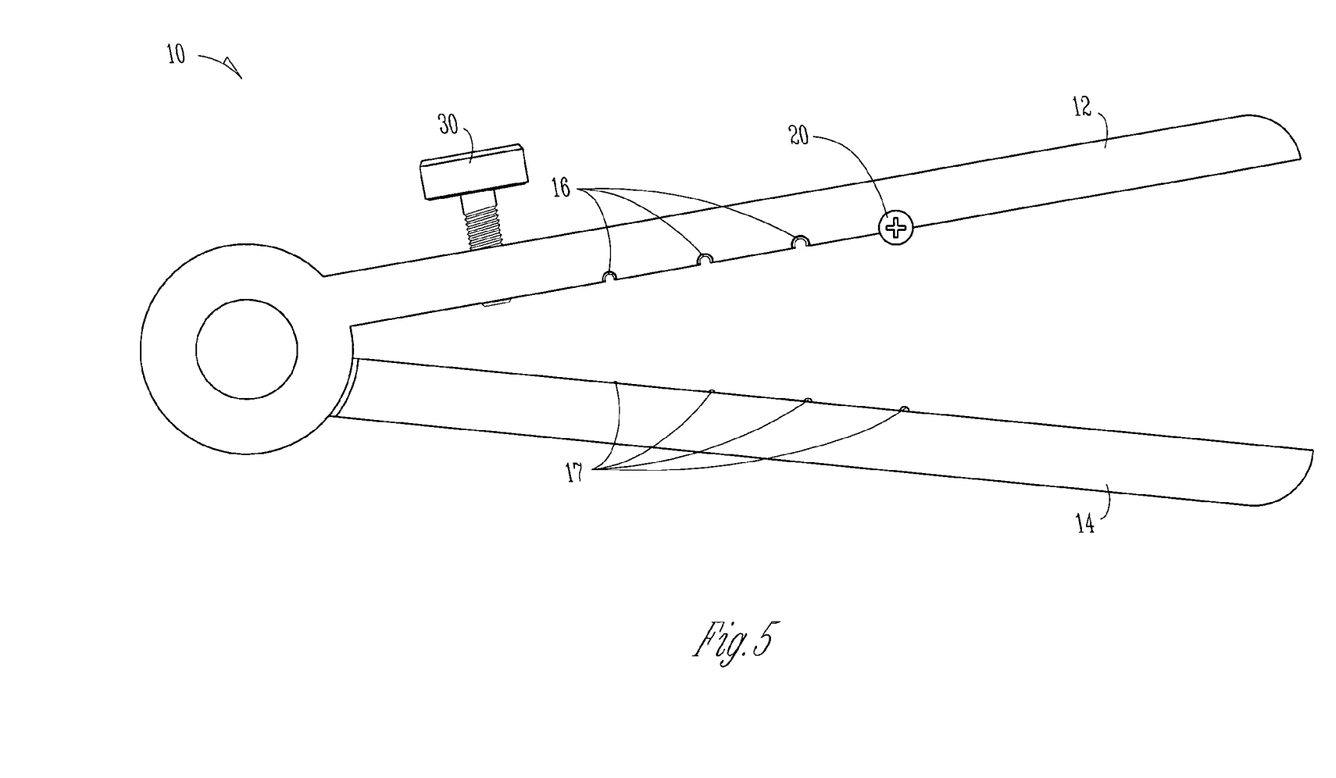
FIG. 5 is a side view of the hand tool shown in FIG. 1 with the arms of the hand tool open and a fastener installed in a threaded opening within the tool.
Figure 6:
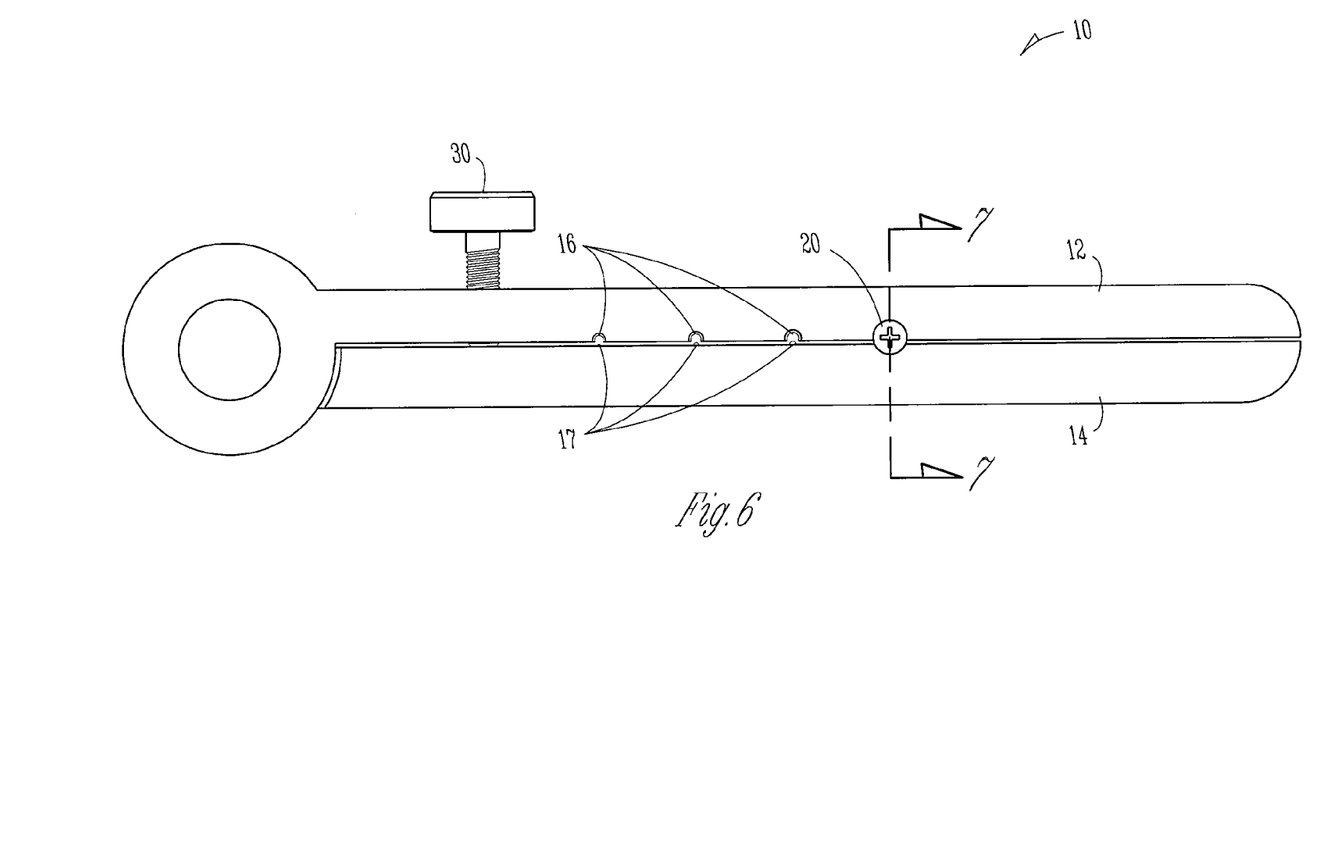
FIG. 6 is a side view similar to FIG. 5 with the arms of the hand tool closed and a fastener within a threaded opening in the tool.
Figure 7:
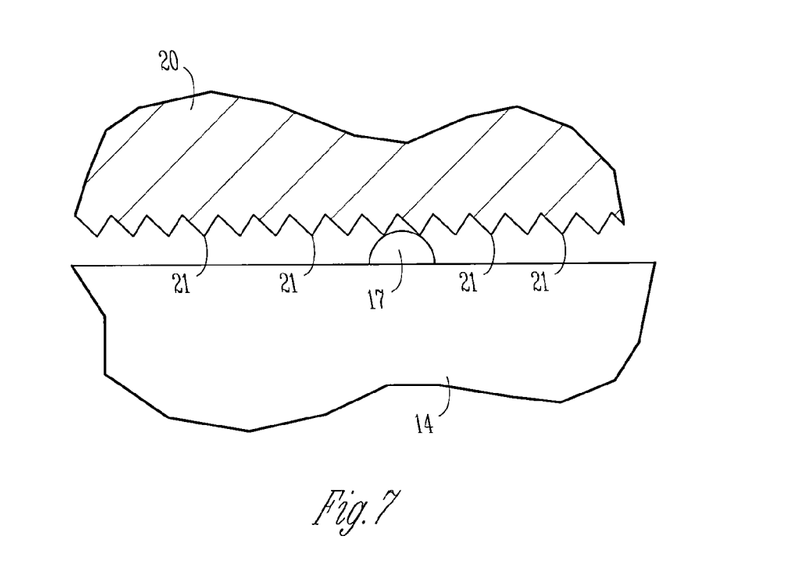
FIG. 7 is a section view of the fastener and tool shown in FIG. 6 taken along line 7-7 as the tool initially engages the threads of the fastener.

During operation of the tool 10, a fastener 20 is inserted into an appropriate-sized opening 16 (see FIG. 5). As shown most clearly in FIG. 6, pressure is applied to bring the first and second arms 12, 14 together such that the appropriate projection 17 engages the threads 21 of the fastener 20 (see FIG. 7) and then deforms the threads 21 (see FIG. 8).

Figure 8:
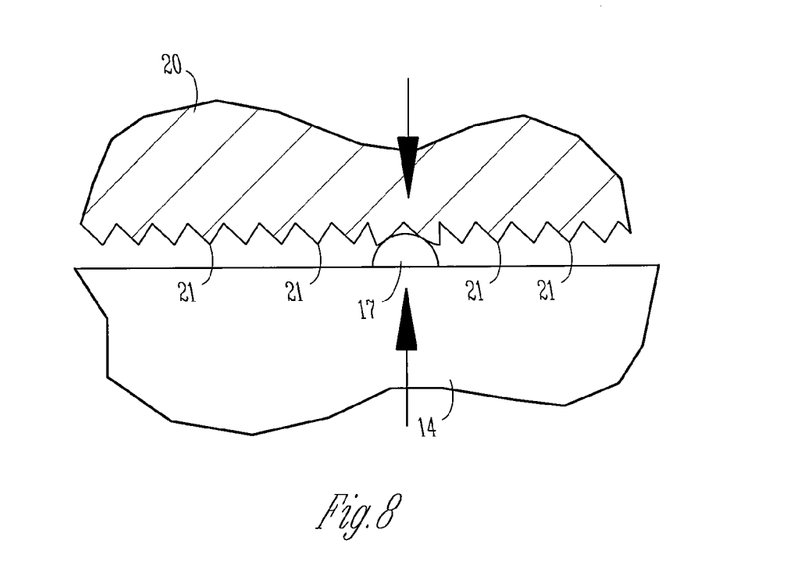
FIG. 8 is a section view similar to FIG. 7 after the tool deforms the threads of the fastener.

Deforming the threads 21 of the fastener 20 increases the running torque that is applied to the fastener 20 when the fastener 20 is used to secure components together to form an assembly. The increased running torque serves to minimize the effect of any vibrations or other loads on the fastener 20 that the assembly may be exposed to during normal use.

In the example embodiment that is illustrated in FIGS. 1-10, the openings 16 in the first arm 12 are threaded openings 16. As shown in the FIGS., the first arm 12 may include a plurality of threaded openings 16 such that each opening 16 is adapted to receive a different diameter (and/or type) of fastener 20.

In addition, the second arm 14 may include a plurality of projections 17 such that each projection 17 is a different size. It should be noted that the size of each projection 17 may correspond with the size of a respective opening 16 that is aligned with each projection 17 when the first and second arms 12, 14 are closed.

In the example embodiment that is illustrated in FIGS. 1-10, the projections 17 have a hemispherical shape. It should be noted that the projections 17 may have other shapes depending on the type of deformation that is required for any of the fasteners 20 that are placed within an opening 16 in the first arm 12 of the holder 10.

In the illustrated example embodiments, one end of the first arm 12 is rotatably connected to an end of the second arm 14. The manner and locations as to how the first and second arms 12, 14 are connected together will depend in part on (i) the overall design of the tool 10; (ii) the size and shape of the first and second arms 12, 14; (iii) the degree of force that the projections 17 need to apply to any fasteners 20 that are placed in the tool 10; and/or (iv) the type and size of fasteners 20 that need to be deformed with the tool 10 (among other factors).

In some embodiments, the tool 10 further includes an adjustable member that is attached to one of the first and second arms 12, 14. In the illustrated example embodiments, the adjustable member is a set screw 30 that is attached to the first arm 12 such that the set screw 30 engages the second arm 14 as the first and second arms 12, 14 are moved together to control the degree of engagement between the projection 17 and the threads 21 of the fastener 20.

Rotating the set screw 30 controls the degree of engagement between the projection 17 on the second arm 14 and the threads 21 of the fastener 20 in the first arm 12. It should be noted that although the adjustable member is shown as a set screw 30 in the illustrated example embodiments, other embodiments are contemplated where the adjustable member 30 has a different size, shape and/or location on the tool 10.

Figure 9:
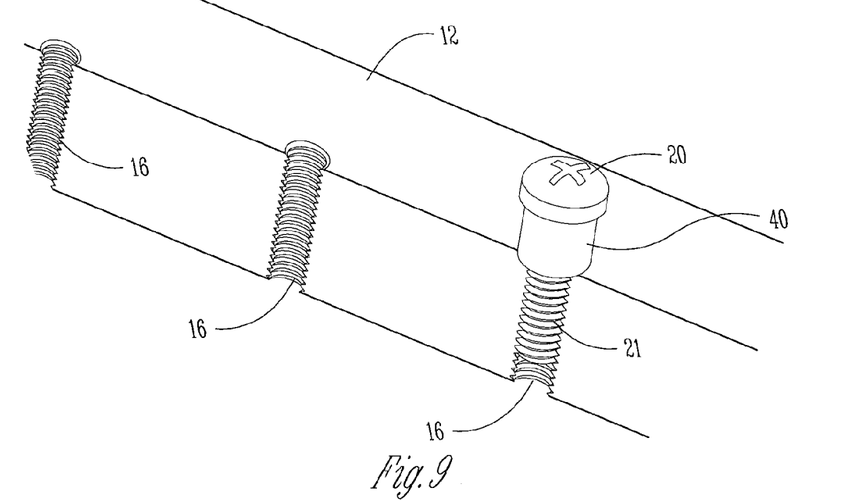
FIG. 9 is an enlarged perspective view of a portion of the hand tool shown in FIG. 3 where a fastener is inserted into a threaded opening in the first arm of the hand tool and a component is limiting how far the fastener is inserted into the threaded opening.
Figure 10:
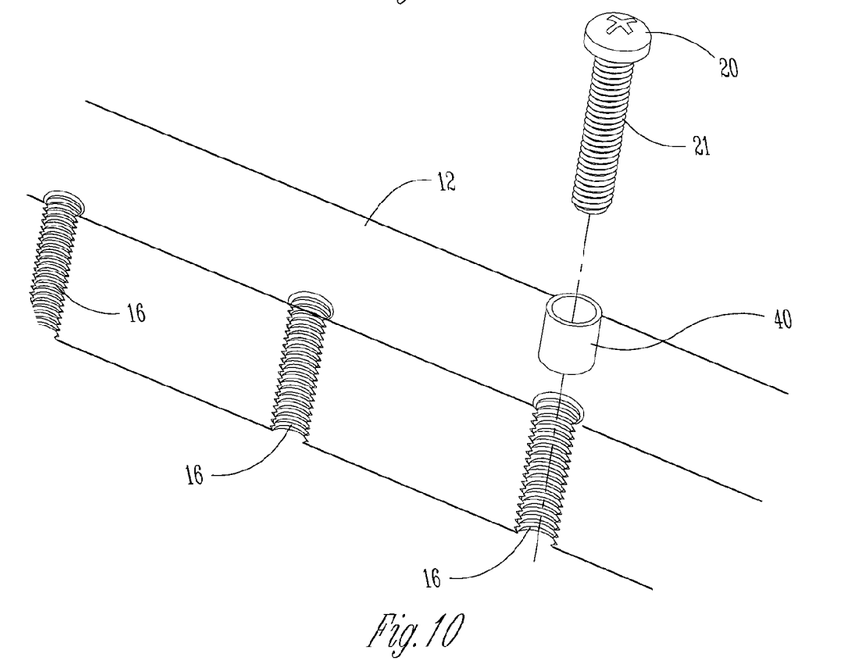
FIG. 10 is an exploded perspective view of the hand tool shown in FIG. 9.

As shown in FIGS. 9 and 10, the tool 10 may further include a component that controls how far the fastener 20 is inserted into the opening 16. In the illustrated example embodiments, the component is a spacer 40 that surrounds the fastener 20 such that the spacer 40 limits how far the fastener 20 is inserted into the opening 16. Since the spacer 40 limits how far the fastener 20 is inserted into the opening 16, the spacer serves to control the location along the length of the fastener 20 where the threads 21 are deformed by the projection 17 when the first and second arms 12, 14 are brought together.

Although the component is shown as a spacer 40 in the illustrated example embodiments, other embodiments are contemplated where the component has a different size, shape and/or location relative to the tool 10. It is important to note that the component needs to provide a consistent way to locate the area of the fastener that needs to be deformed relative to the projection that deforms the threads.

The example tools 10 described herein may allow an operator to select the location along a fastener's length where deformed threads will be deformed by the tool 10. The ability to place threads at a desired location along the length of a fastener makes the deformed threads more likely to be located correctly when the fastener is used to assemble multiple components together (e.g., the deformed threads on the fastener are fully engaged with appropriate mating female threads in one of the assembled components).

In addition, the tool 10 may be able to control the amount that the threads of a fastener are deformed by the tool 10. The ability to control the amount of thread deformation on a fastener may serve to ensure that a correct amount of running torque is applied to the fastener when the fastener is used to secure components together in an assembly.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A hand tool comprising:
   a first arm that includes a plurality of threaded openings such that each threaded opening is adapted to receive a different diameter fastener;
   a second arm connected to the first arm, the second arm having an inner surfaces devoid of openings where each inner surface includes a plurality of projections that extend from said inner surface of the second arm such that each projection is a different size and is aligned relative to one of the threaded openings in the first arm, each of the projections being adapted to deform threads on a fastener to increase the running torque on the fastener when the fastener is installed within one of the respective threaded openings in the first arm, and wherein an end of the first arm is rotatably connected to an end of the second arm; and
   a set screw that is attached to one of the first arm and the second arm and engages the other of the first arm and the second arm as the first and second arms are moved together to prevent the first arm from advancing toward the second arm.

2. The hand tool of claim 1 wherein each of the projections has a hemispherical shape.

3. The hand tool of claim 1 further comprising at least one component that controls how far the fastener is inserted into one of the threaded openings.

* * * * *